UNITED STATES PATENT OFFICE.

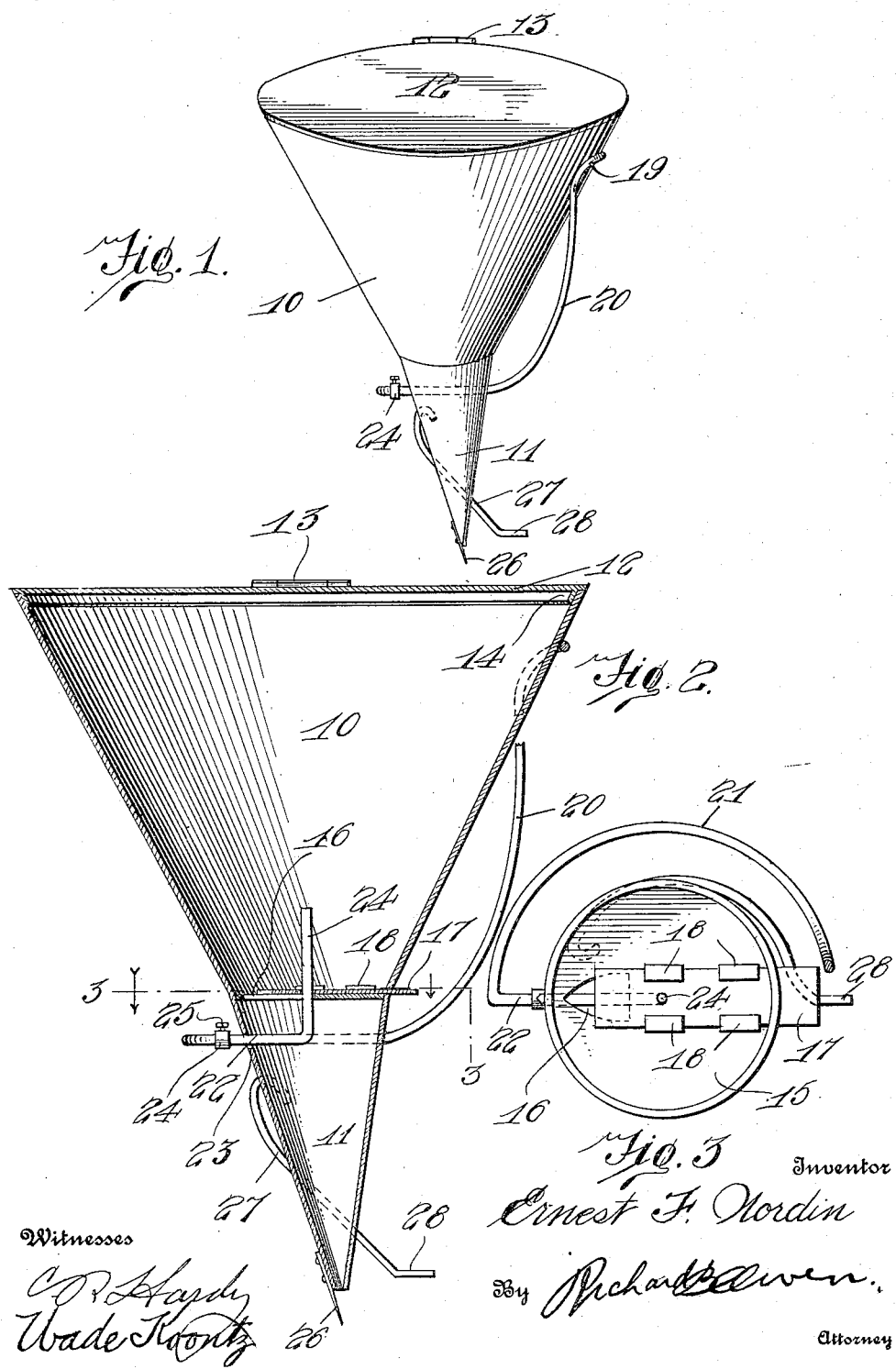

ERNEST F. NORDIN, OF BAYFIELD, WISCONSIN.

HAND SEED-DRILL.

1,277,999.  Specification of Letters Patent.  Patented Sept. 3, 1918.

Application filed October 31, 1914. Serial No. 869,632.

*To all whom it may concern:*

Be it known that I, ERNEST F. NORDIN, a citizen of the United States, residing at Bayfield, in the county of Bayfield and State of Wisconsin, have invented certain new and useful Improvements in Hand Seed-Drills, of which the following is a specification.

This invention relates to seed drills, and the object of the same is to provide a hand seed drill that will open the ground for the reception of the seeds discharged thereby, and will also provide means whereby the said seeds are covered.

Another object of this invention is the production of a hand seed drill in which means that regulate the discharge of seed from the drills can be so adjusted that seeds of different sizes can be planted without changing in any way the operation of the device.

A still further object of this invention is to provide a hand seed drill in which the usual complicated spring devices that actuate the seed feeding means are eliminated, and the actuation of the feeding means is controlled by the handle of the device which is attached directly to the seed feeding means.

A still further object of this invention is the production of a seed drill of the kind above described, that is simple in construction, efficient in operation, consists of the minimum number of parts and therefore can be manufactured for the minimum amount.

With these and other objects in view, this invention consists of certain novel constructions, combinations and arrangement of parts as will be hereinafter fully described and claimed.

In the accompanying drawings:—

Figure 1 is a perspective view of the improved device.

Fig. 2 is a vertical section taken through the device as shown in Fig. 1.

Fig. 3 is a section taken on line 3—3 of Fig. 2, looking in the direction of the arrows.

Referring to the parts by reference numerals, it will be seen that this device is substantially funnel-shaped, and comprises a flared hopper portion 10 and a tapering discharge spout 11 made integrally with the hopper 10. A cover 12 is secured to the hopper 10 by means of the hinge 13, and the same is provided with a circumferential flange 14 adjacent the periphery of the cover, the said flange 14 being spaced from the periphery of the cover, and is disposed at an angle to the main portion of the cover, and thus conforms to the contour of the inner face of the flared hopper 10. This is clearly shown in Fig. 2. If so desired, a handle, a knob or projection of any desired type can be attached or formed with the cover 12 so that the same can be raised from the position as shown in Figs. 1 and 2.

At the juncture of the snout 11 and the flared hopper 10, a division plate 15 is made with the device or secured fast thereto, and is provided with a discharge opening 16 and also a slot formed centrally thereof for the purpose hereinafter set forth. A slide 17 is positioned on the upper face of the division plate 15, and is of such size as to cover the opening 16 formed in the division plate 15, said slide is guided and retained on said plate 15 by means of the lips 18 that are formed on the upper face of the plate 15 and are bent over so as to engage the slide 17, but at the same time to permit the same to have slidable movement on the plate 15. The hopper 10 is provided with an opening in the path of the travel of said slide 17, so as to allow for the projection of a portion thereof out of the hopper so that the opening 16 can be uncovered and the seed passed therethrough. A handle is provided for this device, and is rigidly connected to the outer face of the hopper 10 as at 19, and is then bent so as to be spaced from the outer face of the hopper 10 and form a grip 20. The said handle is then bent to form a portion 21 that is in spaced relation to the spout 11 and is then bent to form an angularly extending portion 22 that passes through an aperture 23 formed in the spout and the same is then bent at right angles to the portion 22 thereof in a vertical plane to form the agitating portion 24. This agitating portion 24 passes through the centrally disposed slot in the division plate 15, and also through an opening formed in the slide 17, and therefore, by movement of this agitating portion 24 in the slot formed in the division plate 15, movement is imparted to the slide 17. As is indicated in Fig. 2, the device thus described is normally closed, and when it is wished to feed a desired amount of seed through the discharge spout 11, a pull on the grip portion 20 of the handle will move the agitating portion 24 in such a direction in the slot formed in the division plate 15 that the slide 17 will be positioned relative to the plate 15, as is shown in Figs. 2 and 3, and the seeds held in the hopper 10 are free to pass through the opening 16 formed in the plate 15. Means is provided with this device whereby seeds of different sizes may be planted by this device, and said means comprises a collar 24 having a set screw 25 passing through a portion thereof, said collar being placed on the angularly extending portion 22 of the handle member, and said collar is retained in the desired position on the portion 22 by means of the set screw 25 engaging said portion 22, and when the grip 20 of the handle member is moved so as to uncover the opening 16, the collar 24 will engage the outer face of the spout 11 and thus limit the movement of the agitating portion 24 of the handle member and thus the slide will cover only the desired portion of the opening 16.

At the discharging end of the discharge spout 11 is rigidly secured a tine or prong 26 that will open the soil for the reception of the seed to be fed through the discharge spout 11, and there is also provided means whereby the seeds after being placed in the soil are covered. On the spout is provided a strip preferably of wire, the same being designated by the numeral 27 and terminates in an angle foot 28, that will move the loose soil over the seed after the prong 26 has been removed from the soil and the seed deposited therein.

This device, as will be readily understood, is adapted for use in hot beds and small gardens where it is impractical or impossible to use a wheel tool that necessitates the using of a draft animal and the device heretofore described will efficiently feed the seeds to the soil, the same being provided with adjustable means whereby seeds of different sizes can be fed through the discharge spout 11 without changing the operation of the drill, and after the same have been fed into the spout 11 and into the earth, the same being facilitated by the prong 26, the handle member that is formed of spring wire or some other resilient material is of course so gripped as to relieve pressure therefrom and allow the slide 17 to completely cover the opening 16. The device is then moved in the desired direction with the prong 26 in the soil and the seed feeding operation is repeated, and the angularly extending foot 28 on the member 27 will move the loose soil over the seed thus deposited. The device is used, as above set forth, when seed is being sown in such soil as will easily permit the moving of the prong 26 in the same, but when it is so desired to sow seed in soil other than the kind above set forth, the soil can be marked and the device used as a seed dropper. It will also be seen that the seeds in the hopper 10 are agitated by means of the portion 24 of the handle member, and thus the feeding thereof through the openings 16 is facilitated.

It is obvious that minor changes may be made in the form and construction of this invention without departing from the material parts thereof. It is therefore not wished to confine the invention to the exact form herein shown and described, but it is wished to include all such as properly come within the scope claimed.

I claim:

1. In a seed drill, a hopper, a discharge spout, a division plate between said hopper and said discharge spout having an opening formed therein, a slide on said division plate, said opening in said division plate being in the path of said slide, said division plate provided with a slot formed centrally thereof, a spring handle member, a grip portion thereon, a portion of said handle member extending into said discharge spout and passing through said slot in said division plate and in engagement with said slide, whereby by the movement of said grip portion of said handle member, said slide will be moved on said division plate and an adjustable means on said handle member whereby the same abuts the outer face of said discharge spout so as to limit the movement of said portion of said handle member in engagement with said slide.

2. In a seed drill, a hopper, a discharge spout, a division plate between said hopper and said discharge spout, means on said division plate for regulating the feeding of seeds from said hopper to said discharge spout, a handle member comprising a grip, a portion of said handle member bent in spaced relation to said discharge spout, a second portion of said handle member bent at right angles to said discharge spout and projected thereinto and a third portion of said handle member bent at right angles to said last-mentioned portion and in engagement with said seed feeding means whereby the actuation of said grip portion of said handle member operates said seed feeding means.

In testimony whereof I affix my signature in presence of two witnesses.

ERNEST F. NORDIN.

Witnesses:
E. L. PROTHERO,
F. M. HERRICK.

Copies of this patent may be obtained for five cents each, by addressing the "Commissioner of Patents, Washington, D. C."